(12) United States Patent
Minowa et al.

(10) Patent No.: US 6,885,471 B1
(45) Date of Patent: Apr. 26, 2005

(54) PRINTER CONTROLLER, PRINTER CONTROL METHOD, AND DATA STORAGE MEDIUM FOR RECORDING THE CONTROLLER AND CONTROL METHOD

(75) Inventors: Masahiro Minowa, Hata-machi (JP); Asahiro Oguchi, Okaya (JP); Teruaki Oguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/534,192

(22) Filed: Mar. 24, 2000

(30) Foreign Application Priority Data

Mar. 25, 1999 (JP) ............................. 11-082571

(51) Int. Cl.[7] ........................ G06F 15/00; B41J 21/16; B21J 29/38
(52) U.S. Cl. .................. 358/1.15; 358/1.18; 400/279; 347/5
(58) Field of Search .................. 358/1.15–1.18; 400/1, 24.01, 3, 279; 347/5

(56) References Cited

U.S. PATENT DOCUMENTS 4,710,886 A * 12/1987 Heath ...................... 358/1.18
5,467,433 A * 11/1995 Lamprecht, Jr. et al. ... 358/1.15
5,806,997 A *  9/1998 Kawanabe ............. 400/124.01
6,697,678 B1 *  2/2004 Miyasaka et al. ............. 700/9

* cited by examiner

Primary Examiner—Kimberly Williams
Assistant Examiner—Saeid Ebrahimi
(74) Attorney, Agent, or Firm—Mark P. Watson

(57) ABSTRACT

A printer controller, printer control method, and data storage medium detect a real-time command pattern in the print data to prevent unintended real-time commands from being executed by the printer. The evaluating unit detects whether a command data stream for printing image data sent to a printer contains a specific data sequence. When the specific data sequence, such as the data sequence of a real-time command, is present in the command data stream, the generating unit generates a plurality of command data stream segments not containing the specific data sequence but producing printing image data identical to the image data of the original data stream to the printer; the sending unit then sends the plurality of command data stream segments generated by the generating unit to the printer.

32 Claims, 9 Drawing Sheets

| m | mode | vertical dot count | dot density(dpi) vert | dot density(dpi) horiz | data size k(bytes) |
|---|---|---|---|---|---|
| 0 | 8 dot single density | 8 | 60 | 180 | n |
| 1 | 8 dot double density | 8 | 60 | 360 | n |
| 32 | 24 dot single density | 24 | 180 | 180 | 3n |
| 33 | 24 dot double density | 24 | 180 | 360 | 3n |
| 80 | 48 dot single density | 48 | 360 | 180 | 6n |
| 81 | 48 dot double density | 48 | 360 | 360 | 6n |

FIG. 9

PRINTER CONTROLLER, PRINTER CONTROL METHOD, AND DATA STORAGE MEDIUM FOR RECORDING THE CONTROLLER AND CONTROL METHOD

BACKGROUND OF THE INVENTION

1. Field of the Invention

The present invention relates to a printer controller, a printer control method, and to a computer-readable medium that records the printer controller (e.g. in the case of a software printer driver) and/or the printer control method. More particularly, the present invention relates to a printer controller and a printer control method for preventing printer operating errors in a printer that processes real-time commands. Such errors may occur when such a printer receives for printing an image data stream containing a data sequence identical to a real-time command data sequence. The present invention also relates to a data storage medium for recording a computer-readable program for performing the printer control method and or embodying the printer controller as a software printer driver.

2. Description of the Related Art

Printers are widely used for printing text and images on paper and other printing media. Such printers are typically connected to a data processing terminal such as a personal computer or other type of general purpose host computer. The host computer or terminal sends to the printer a data stream containing the text, images, and other data to be printed, as well as a data stream for controlling printer operation. This type of host computer thus functions as a printer control device (referred to simply as a "printer controller" herein).

The data sent from the host computer can be thought of as a bit stream or a byte stream. Many printers use a command system expressed using units of 8 bits (1 byte). The number of bits in each command is thus a multiple of eight, and commands are constructed using a data stream containing a number of bytes.

A data stream for printing text typically contains the byte values for the ASCII codes of characters to be printed, while a method of expressing black and white pixels by individual bits in a byte stream is used for printing images and user-defined fonts or characters. A technique for printing color images uses a number of bits contained in each byte to express the color of each pixel in an image. Data thus expressing images for printing is referred to as image data below.

When the printer receives one or a plurality of bytes from a host computer via a host/printer interface, a receive interrupt occurs and a receive interrupt process is initiated. This receive interrupt process includes the following operations:

(1) detecting whether a real-time command is contained in the received data, and immediately executing the process corresponding to the real-time command if a real-time command is received; and (2) storing the received data in a receive buffer comprising a reserved portion of RAM (Random Access Memory).

Normal commands and print data are processed in first-in first-out (FIFO) sequence after being stored in the receive buffer. However, real-time commands are high priority commands that are processed before being stored in the receive buffer, and are given precedence over normal commands and print data.

Normal processing resumes when the receive interrupt process ends. This normal process interprets the data stream stored in the receive buffer, and generates a print image in the print buffer reserved as a portion of RAM. This print image is typically a bit stream of 1s and 0s indicative of which parts of the print area are to be printed white and which parts are black, that is, a bit stream used to control print head drive. When image data for one pass (e.g., one line) of the print head is generated, the print head is driven according to the print buffer contents to print the text and/or image.

When the data stream read from the receive buffer is a data sequence of a real-time command, the normal process simply skips the command because a process for that command has already been completed in the receive interrupt process.

Commands described below have conventionally been used as real-time commands. It should be noted that the byte sequences shown below are represented by the conventional mnemonics for the corresponding ASCII codes:

DLE EOT NUL: send the printer status to the host computer in real time;

DLE EOT BEL: send the printer ink status to the host in real time;

DLE EOT BS: send the MICR (magnetic ink character recognition) status to the host in real time;

DLE ENQ: real-time request to printer; and

DLE DC4 SOH: output a specific pulse in real time.

The hexadecimal expressions for the above mnemonics are defined as shown below where "0x" is a prefix indicating a hexadecimal number:

NUL=0x00
SOH=0x01
EOT=0x04
ENQ=0x05
BEL=0x07
BS=0x08
DLE=0x10
DC4=0x14.

As shown above, byte values other than NUL, SOH, EOT, ENQ, BEL, BS, DLE, and DC4 are not contained in real-time command data streams.

An image print command typical of a normal command conventionally used for printing an image 8 dots high and n dots wide has the following format:

ESC 0x6d n d1 . . . dn where the values d1 to dn are eight bit values indicating which bits arranged eight high are black and which are white. In other words, the values d1 to dn are an image data stream. The value "n" in this print command is defined herein as the length parameter, and the n-byte long data stream of values d1 to dn is defined as the image data parameter. These parameters can be any desired byte value.

A problem is that a data stream identical to a real-time command can circumstantially occur in the data stream of an image data sequence. This can result in a process corresponding to an actual real-time command being performed in the receive interrupt process described above even though the received data stream should not be interpreted as a real-time command.

This means that an unexpected real-time command process is executed at a time unexpected by the host computer. This may result, for example, in the host computer losing the ability to communicate with the printer because the printer is returning status data to the host at a time when the host is not prepared to receive and process the status data.

There is, therefore, a need for a printer capable of processing real-time commands that, when it receives an image data stream containing a bit or byte sequence identical to a real-time command data sequence, can properly print the image data rather than improperly perform the real-time command process.

Methods for achieving this result by changing or expanding the printer command system are conceivable. However, there is also a great need for the ability to distinguish and process real-time command data streams separately from other data streams in a way that enables continued use of existing printer resources; that is, in a way that does not require existing printer resources to be replaced.

OBJECTS OF THE INVENTION

Therefore, it is an object of the present invention to overcome the aforementioned problems.

The present invention resolves these problems, and has as an object to provide a printer controller, a printer control method, and a data storage medium for storing a computer-readable program for the performing the method, for preventing printer operating errors in a printer capable of processing real-time commands when such a printer is controlled to print image data containing a data sequence identical to a real-time command data sequence.

SUMMARY OF THE INVENTION

To achieve the above objects, a printer controller according to the present invention comprises an evaluating unit, a generating unit, and a sending unit. The evaluating unit detects whether a send data stream (such as a bit image print command) to be sent to a printer contains a specific data sequence (such as the data sequence of a real-time command). If the evaluating unit determines that a specific data sequence is contained in the send data stream, the generating unit divides the send data stream into a plurality of data stream segments not containing the specific data sequence, the plurality of data stream segments resulting in the same function as the send data stream. The sending unit sends the send data stream or the plurality of data stream segments to the printer based on the result of the evaluating unit.

Achieving the identical function of the send data stream can be accomplished with the plural data stream segments by generating the plural data stream segments with the same header as used in the send data stream, but generating the parameter part of the data stream segments according to the number of segments into which the send data stream has been divided.

It is therefore possible, using the present invention, to detect on the host computer side a real-time command pattern in the print data before the print data is sent to the printer, segment the data into a plurality of blocks splitting the real-time command pattern between blocks, and then send the resulting blocks to the printer. It is therefore possible as a result of this segmentation to prevent unintended real-time commands from being executed by the printer.

Another aspect of a printer controller according to the present invention is the capability to transmit a particular send data stream to a printer: The send data stream includes a print data sequence arranged in a matrix and includes length parameters indicating the length in a row direction and the length in a column direction of the matrix. The printer controller comprises: an evaluating unit for detecting whether the print data sequence includes a specific data sequence; a determination unit for determining, on the basis of a detecting result given by the evaluating unit, the position at which the specific data sequence is located if the specific data sequence is included in the print data sequence; a division unit for inserting dummy data into the print data sequence in accordance with a determination result given by the determination unit and dividing the print data sequence into a plurality of divided print data sequences; a conversion unit for producing length parameters presenting the lengths of respective divided print data sequences from the length parameters of the send data stream in accordance with the determination result given by the determination unit; and a transmission unit for transmitting one of the send data stream and a plurality of data stream segments to the printer, the plurality of data stream segments including respective divided print data sequences produced by the division unit in accordance with the determination result given by the determination unit and also including respective length parameters produced by the conversion unit.

In accordance with the printer controller according to the present invention, when image data arranged in a matrix fashion includes a data sequence identical to a real-time command, the image data is transmitted to a printer after inserting dummy data into the image data and then dividing it, thereby preventing the printer from operating in an incorrect manner.

It is desirable that the length of the dummy data inserted into the image data be determined in accordance with the parameter indicating the size of the matrix of the image data. It is also desirable that the print start position be corrected depending on the inserted dummy data. Thus, it is possible to prevent the printer from operating in an incorrect manner thereby ensuring that the image data is printed in a desired manner.

In the case where a data sequence identical to a real-time command is located starting from the bottom row of the matrix of the image data, the image data may be divided into two parts. The first part includes, at its end, the first byte of the data sequence identical to the real-time command. The second part includes the remaining data following the first byte of the data sequence identical to the real-time command. This achieves the purpose of breaking up the real time command data sequence without having to insert dummy data.

The direction along the columns of the data matrix may be selected to be parallel to the paper feeding direction of the printer.

The present invention is also embodied as a printer control method, and this method can achieve the same advantages and benefits described above. In addition, a control method according to the present invention can be provided as a control program that can be run by a control unit for the printer controller.

The printer controller, printer control method, and software program (e.g. printer driver) for implementing the controller and/or printer control method can be embodied on a computer-readable data storage medium such as a Compact Disc (CD), floppy disc, hard disk, magneto-optical disk, Digital Video Disk (DVD), magnetic tape, or semiconductor memory.

A program for controlling a printer controller and implementing the printer control method of the present invention can be run on a general purpose computer, such as a personal computer. In this case the general purpose computer is considered a printer controller according to the present invention, and the printer control method of the present invention can performed with the general purpose computer.

The program of the present invention can also be uploaded to a server computer connected to the Internet (World Wide Web) or other computer network from which a user can, as desired, download the program for storage in a local data processing device to update or otherwise employ the program with a local printer.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings, wherein like reference symbols refer to like parts:

FIGS. 8A, 8B and 8C are schematic diagrams illustrating data structures associated with the data dividing process according to the second embodiment of the present invention.

FIG. 9 is a table listing different parameters for a variety of dot density modes.

DESCRIPTION OF THE PREFERRED EMBODIMENTS

A preferred embodiment of the present invention is described below with reference to the accompanying figures. It shall be noted that this preferred embodiment is illustrative of the present invention only and shall not limit the intended scope of the invention in any way. It will therefore be obvious to one with ordinary skill in the related art that other variations are possible by replacing any or all of the described elements with an equivalent, and these variations shall also be included within the scope of the present invention.

A printer, which structurally may be one of a number of conventional printers, controlled by a printer controller of the present invention is described first below, and is then followed by description of a printer controller of the present invention.

An Exemplary Printer

Figure 1:
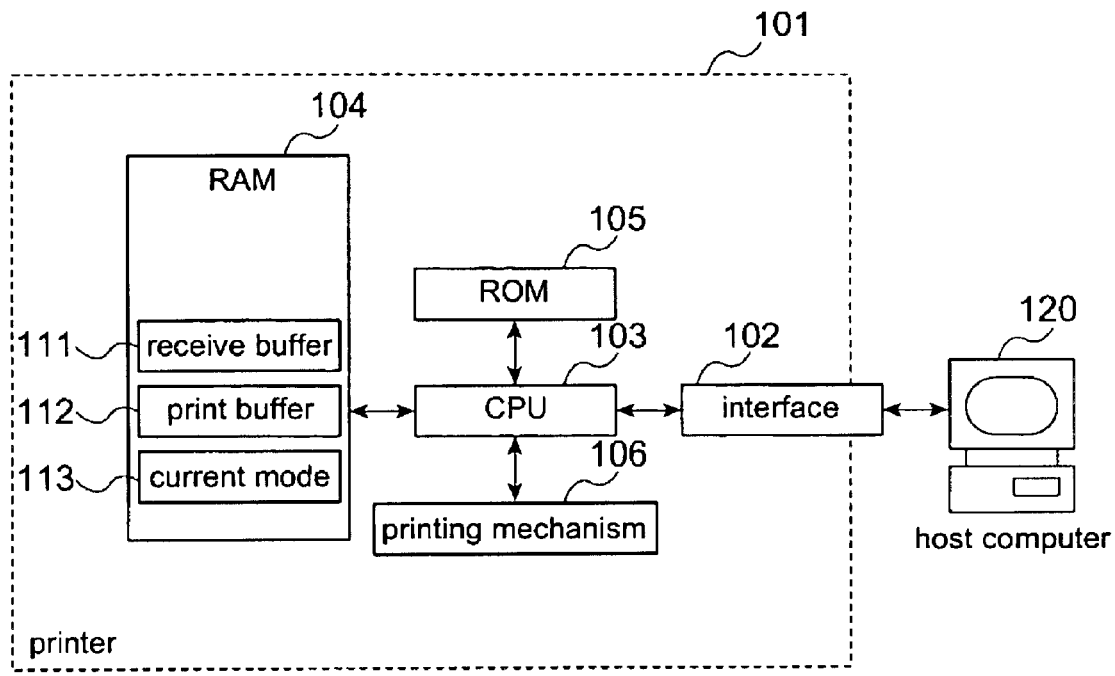
FIG. 1 is a block diagram of an exemplary printer controlled by a printer controller (host computer) according to a preferred embodiment of the present invention.

FIG. 1 is a block diagram of an exemplary printer controlled by a printer controller (host computer) according to a preferred embodiment of the present invention.

As shown in FIG. 1 this printer 101 is connected through interface 102 to a host computer 120. When the printer 101 receives through the interface 102 a data stream sent by the host computer 120, a receive interrupt is issued to the CPU 103. This receive interrupt causes the CPU 103 to start a receive interrupt process. If this receive interrupt process detects a real-time command in the received data stream, it runs a corresponding real-time process for executing the command. This receive interrupt process also stores the received data stream in a receive buffer 111 reserved in RAM 104. When the receive interrupt process is completed, the CPU 103 returns to normal process control.

In the normal process, the CPU 103 interprets the data stream stored in the receive buffer 111 of RAM 104 as print commands, print data and printer setting commands. It fetches font information from the ROM 105 in which font information is stored and generates image data to store a print image in the print buffer 112 reserved in RAM 104.

When the print image generated in the print buffer 112 reaches a particular size, such as a one-line equivalent, the CPU 103 drives the printing mechanism 106 to print the text and/or image on paper or other printing medium.

If the data stream stored in receive buffer 111 is a font definition command, the font definition is stored in RAM 104. If the ROM 105 is an EEPROM (Electrically Erasable Programmable ROM) device, flash memory, or other type of updateable nonvolatile storage, the content of ROM 105 can also be updated according to the font definition command.

An area 113 for storing the current mode used by the receive interrupt process is also reserved in RAM 104. It is therefore possible to detect whether a real-time command is being received or other data is being received.

The Receive Interrupt Process of the Printer

Figure 2:
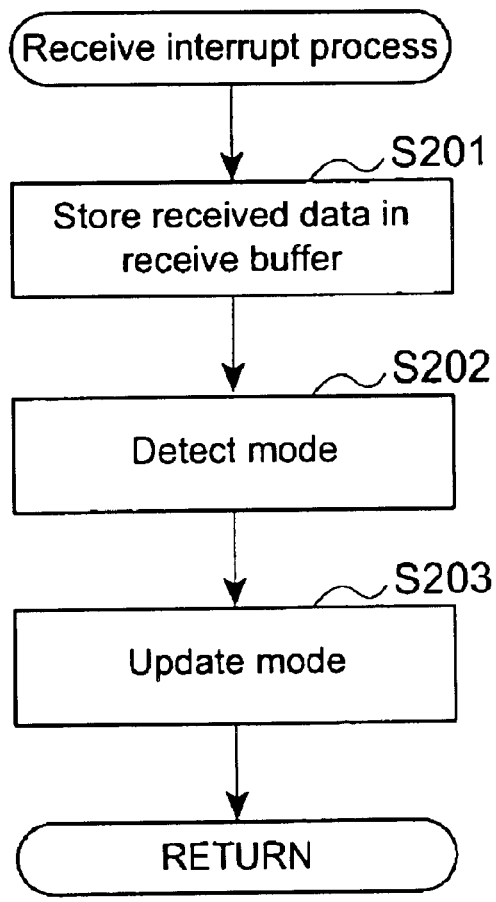
FIG. 2 is a flow chart of a receive interrupt process of a printer controlled by a printer controller according to the present invention.

FIG. 2 is a flow chart of a receive interrupt process in the printer 101 shown in FIG. 1. This receive interrupt process starts when a data stream sent by the host computer 120 is received by the printer interface 102. It should be noted that the interface 102 generates a receive interrupt every time it receives one byte in this exemplary embodiment. However, the same control can be achieved by generating a receive interrupt every time some desired number of bytes greater than one is received, and such variations are also included within the scope of the present invention.

As noted above, this receive interrupt process is started when the printer interface 102 receives data sent by the host computer 120.

When the receive interrupt process starts, the CPU 103 stores one byte of data received by the interface 102 in the receive buffer 111 of RAM 104 (step S201). Note that this receive buffer 111 is typically a ring buffer.

Next, the CPU 103 detects the current receive interrupt mode stored in the mode area 113 of RAM 104 (step S202). Whether a real-time command is being currently received is indicated by the value of the receive interrupt mode.

Figure 3:
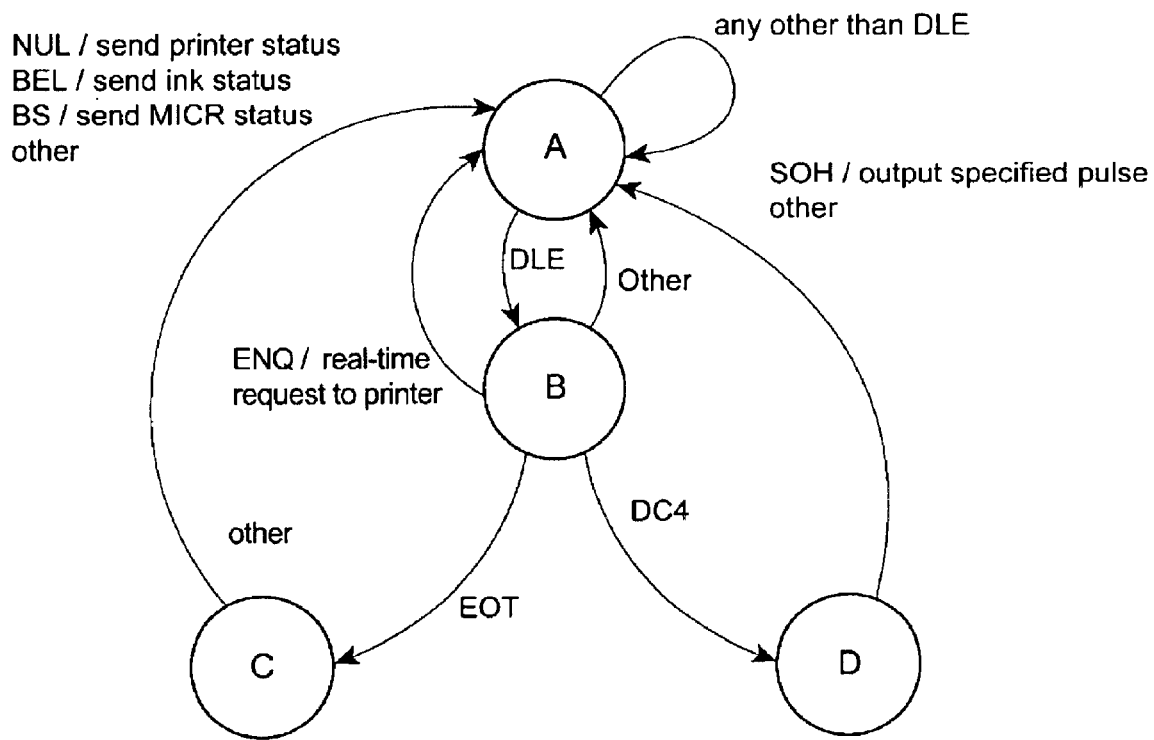
FIG. 3 shows the state transitions occurring as a result of a receive interrupt in a printer controlled by a printer controller according to the present invention.

The value of the receive interrupt mode stored in mode area 113 is then updated based on the data value received in step S201 according to the state transition diagram shown in FIG. 3. A corresponding process is run if necessary (step S203), and the interrupt process then ends.

FIG. 3 is a receive interrupt state transition diagram. Note that this state transition diagram is determined by the system of real-time command data streams.

Mode A in FIG. 3 is a mode in which commands other than real-time commands are interpreted. If currently in mode A and the data value received in step S201 is DLE, mode B is entered.

Mode B means that the first byte (DLE) of a real-time command is being received. The transition from mode B is determined as follows for the byte value received in step S201. That is, if the value received in step S201 is:

EOT, mode C is selected;

ENQ, the process corresponding to the real-time request to the printer is executed, and then mode A is selected;

DC4, mode D is selected;

any other value, mode A is resumed because the data stream being received is not a real-time command stream.

Mode C means that a real-time command beginning with DLE EOT is being received. The transition from mode C is determined as follows for the byte value received in step S201. That is, if the value received in step S201 is:

NUL, the current printer 101 status is sent in real-time to host computer 120, and mode A is then resumed;

BEL, the condition of ink in the printing mechanism 106 of printer 101 is sent to the host computer 120 in real-time, and mode A is then resumed;

BS, the MICR status is sent in real-time to host computer 120, and mode A is then resumed;

any other value, mode A is resumed because the data stream being received is not a real-time command stream.

Mode D means that a real-time command beginning with DLE DC4 is currently being received. The transition from mode D is determined as follows for the byte value received in step S201. That is, if the value received in step S201 is:

SOH, a specified pulse is output in real-time, and mode A is then resumed;

any other value, mode A is resumed because the data stream being received is not a real-time command stream.

If the state transition process is relatively simple, this receive interrupt process can be completed in a short time.

The Normal Process of the Printer

Figure 4:
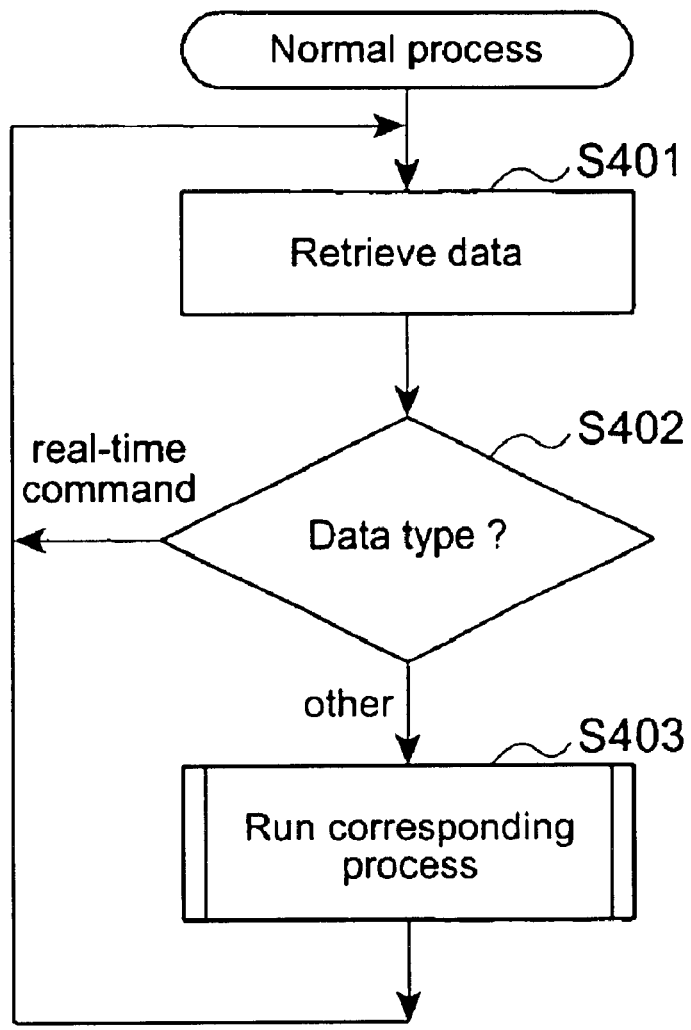
FIG. 4 is a flow chart of normal process control in a printer controlled by a printer controller according to the present invention.

This normal process is the process of interpreting and printing data received by printer 101. FIG. 4 is a flow chart of normal process control in the printer 101 shown in FIG. 1. A receive interrupt process can be started by a receive interrupt as described above when this normal process is being run.

The CPU 103 fetches data from the receive buffer 111 as long as unprocessed data remains in the receive buffer 111. If there is no unprocessed data in the receive buffer 111, the CPU 103 waits until data is stored in the receive buffer 111 by the receive interrupt process. These processes are thus handled as co-routines. For simplicity of discussion, running the above process once to retrieve one byte of data from receive buffer 111, and performing the process plural times to retrieve a plurality of bytes from the receive buffer 111, are both referred to below as simply retrieving data from the receive buffer.

After the CPU 103 retrieves data from the receive buffer 111 (step S401), it detects the data type (step S402).

If step S402 determines the data is part of a real-time command data sequence (step S402 returns "real-time command"), the procedure loops back to step S401 in order to skip the command. This is because the real-time command process has already been completed during the receive interrupt process.

On the other hand, if the data stream is part of another type of command, for example, if a data sequence for a normal process command is detected (step S402 returns a normal command), the process corresponding to that command is run (step S403), and then the procedure loops back to step S401.

"Normal process" as used herein includes processes for printing text and/or graphics, printing images, storing a font, or performing various printer 101 settings. It should be noted that in the present invention the image data is sent to the printer 101 as a binary expression for printing images.

A printer controller according to the present invention can thus also control printers that are already widely used.

Preferred Embodiment of a Printer Controller

Figure 5:
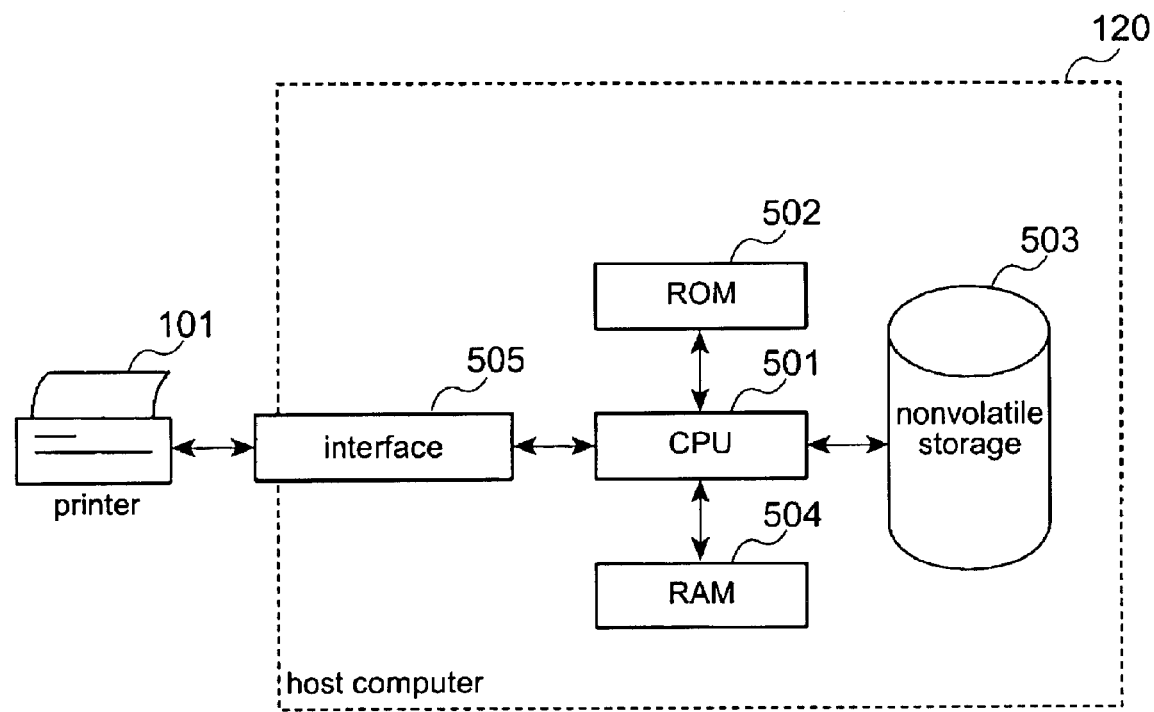
FIG. 5 is a block diagram of an exemplary embodiment of a printer controller according to the present invention.

FIG. 5 is a block diagram of a printer controller (host computer) according to a preferred embodiment of the present invention.

A host computer 120 according to the present invention is controlled by a CPU 501. When host computer 120 power is turned on, the CPU 501 runs an initial program loader (IPL) stored at a specific address in ROM 502, begins a process, and can then run a program stored on hard disk, floppy disk, CD-ROM, or other type of nonvolatile storage 503. When running a program, RAM 504 is used as temporary storage.

When running an application program for printing text or graphics, a print command data stream is sent through interface 505 to the printer 101.

It will also be obvious that the host computer 120 can further comprise a keyboard, mouse, or other type of input device (not shown in the figures), as well as some type of display.

The operating system (OS) that runs on the host computer 120 uses the hardware, such as a printer 101, connected to the host computer 120 as resources, and manages these resources for sharing among a plurality of applications as necessary and appropriate. A program accomplishing such resource management is a printer driver as noted above.

When the printer driver operates as part of the operating system in the host computer, the host computer is a printer controller according to the present invention.

The printer driver receives image data sent from an application as a system call to the OS.

The CPU 501 also detects image data stored in RAM 504, processes the data, and sends it through interface 505 to the printer 101. The CPU 501 in conjunction with RAM 504 and interface 505 therefore functions as the evaluating unit, generating unit, and sending unit of the present invention, and also as the determination unit, division unit, conversion unit, and print start position specifying unit. In the drawings and description below each of these functional units comprises one or more of the interface 505, ROM 502, RAM 504, nonvolatile storage 503, and CPU 501 that runs under program control and operates with each of the other major components shown in FIG. 5. However, each of the functional units including the determination unit, division unit, etc. may be embodied in discrete circuitry, software, firmware, ASIC, or any combination thereof.

In addition, the nonvolatile storage 503 functions as a computer readable data storage medium for storing a software program (printer driver) for performing the method of the present invention and/or embodying the printer controller, when used to control host computer 120, of the present invention.

Figure 6:
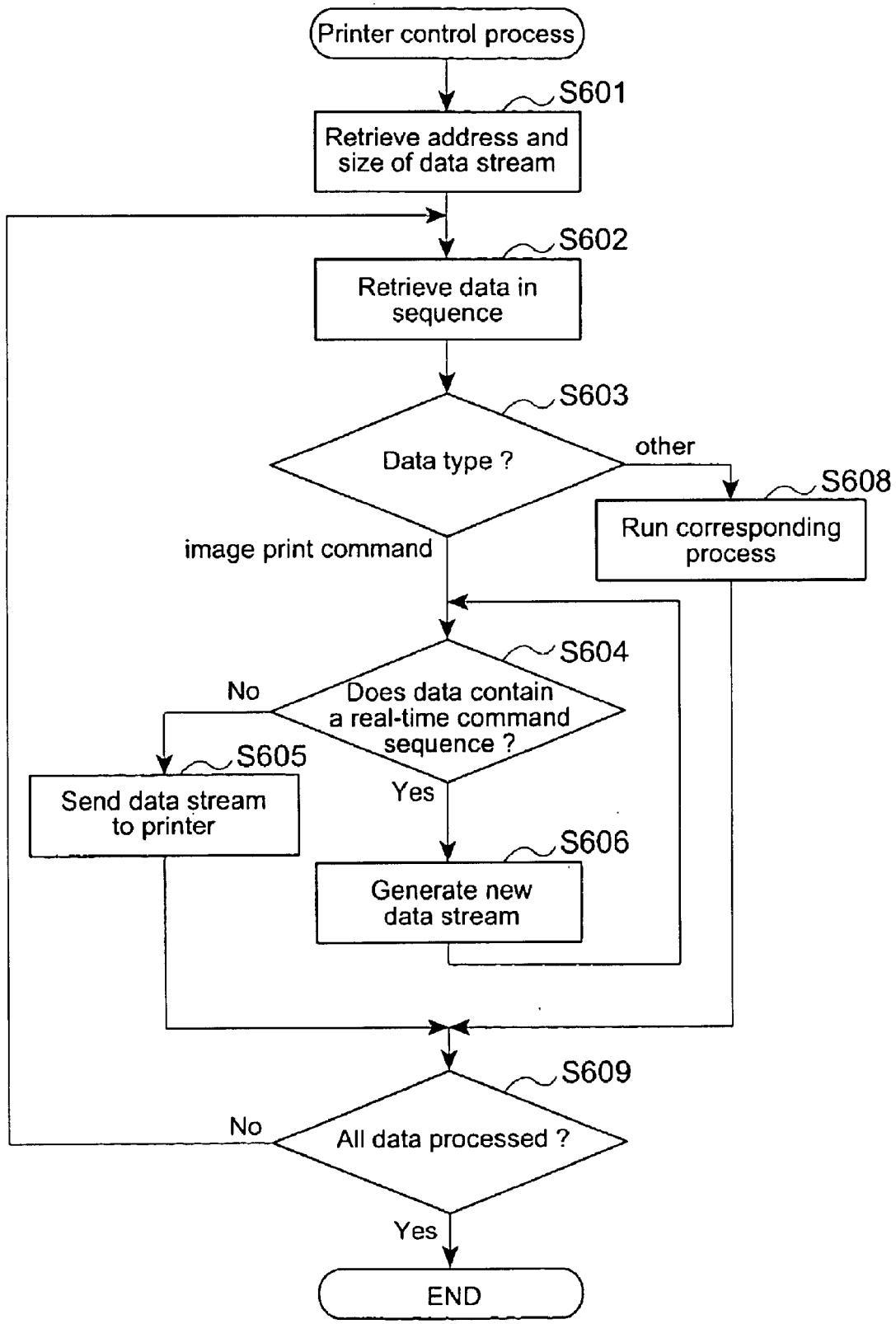
FIG. 6 is a flow chart of a printer control method run by the printer controller according to the present invention.
Figure 7:
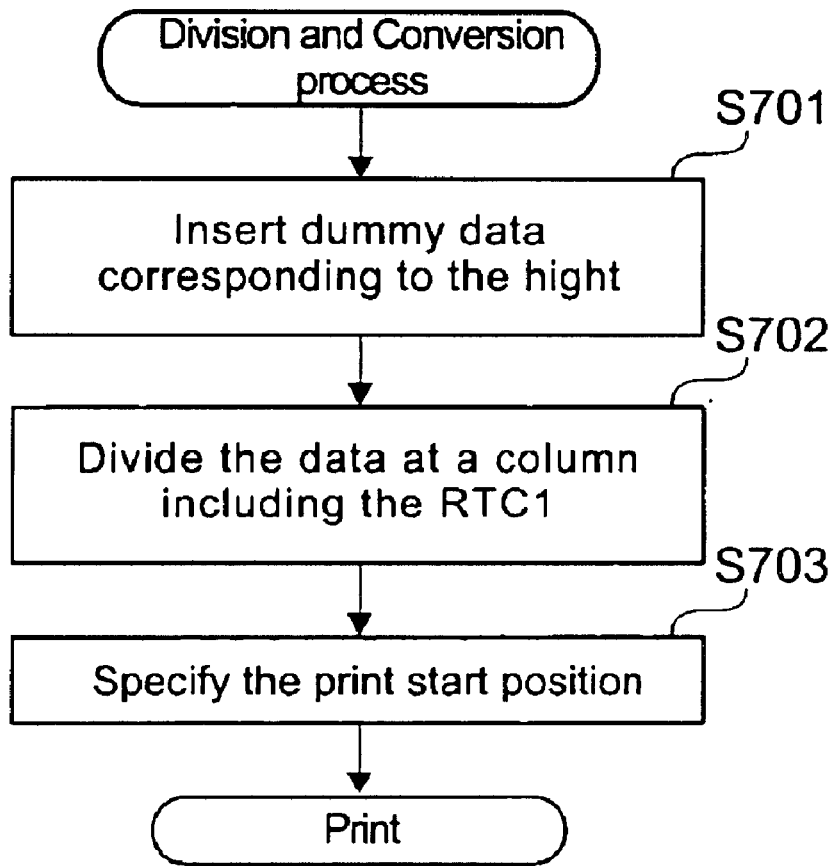
FIG. 7 is a flow chart illustrating the data dividing process according to the second embodiment of the present invention.

FIG. 6 is a flow chart used to describe the printer control method of the printer controller shown in FIG. 5.

The printer control method of the present invention starts when an application managed by the OS issues a system call to the OS requesting a print operation. It could also be started as a subroutine process of the printer driver.

When this process starts, the CPU 501 determines the address in RAM 504 where the data for the print process specified by the system call is stored, and detects the size of the data (step S601).

Data is then read in sequence from the address detected in step S601 (step S602), and the CPU 501 then detects the type of process in which the data is to be used (step S603).

If the data stream is an image print command (step S603 returns "image print"), that is, if the data is specified in the format ESC 0x6d n d1. . . dn, then the parameter part (n d1 . . . dn) of the data stream is read to determine whether a data sequence identical to a real-time command is present (step S604).

If a sequence identical to a real-time command is not present, the print command data stream is sent to the printer 101 (step S605), and control advances to step S609.

If a sequence identical to a real-time command is present, a conversion process as described below is performed to split the print command data stream and generate a plurality of new print command data streams (step S606).

The program flow then loops back to step S604 so that each of the resulting new print command sequences is then similarly evaluated. If the new data stream contains a real-time command sequence, the new data stream is further split to generate yet additional new command streams (step S606), which are fed back for evaluation at step S604 until no real-time command sequences are detected in the data stream (No in step S604). The resultant data stream is then sent to the printer (step S605). This processing continues until all data has been retrieved and processed (step S609).

If the data stream is a command other than an image print command (step S603 returns "other"), the process corresponding to the detected command is performed (step S608), and control advances to step S609.

Step S609 then detects whether all data streams specified by a system call, for example, have been processed. If they have (step S609 returns yes), this process ends. If not, the procedure loops back to step S602.

The process in which the print command data stream is converted into a plurality of data streams in step S606 is described next below. It should be noted that a data stream identical to the data stream for a real-time command can occur in an image print command in the following two ways in this exemplary embodiment of the invention:

(1) a data sequence identical to the data sequence of a real-time command begins from the length parameter; or (2) a data sequence identical to the data sequence of a real-time command is contained in the image data parameter.

A command division and conversion process is performed for each of these cases.

The first case considered below is when a data sequence identical to the data sequence of a real-time command begins from the length parameter of the image print command. This occurs when the byte value of the length parameter is DLE=0x10=16, that is, the image is 8 dots high and 16 dots wide. This can be resolved by splitting the image print command into two image print commands of which the sum in the line-width direction is 16. For example, if the host supplies a print command such as ESC 0x6d 16 d1 d2 d3 . . . d16, it can be split into two command such as ESC 0x6d 1 d1

ESC 0x6d 15 d2 d3 . . . d16.

In this case the image print command is split into two commands that first print image data d1 only one dot wide, and then prints fifteen dot wide image data d2 d3 . . . d16. Various other combinations that result in a sum of 16 will obviously be possible. For example, ESC 0x6d 2 d1 d2

ESC 0x6d 14 d3 . . . d16 is also possible. This command division and conversion process thus generates a data stream in which a data sequence identical to the data sequence of a real-time command does not begin from the length parameter of the image print command.

The second case noted above is considered next, that is, the command division and conversion process performed when a data sequence identical to the data sequence of a real-time command is contained in the image data parameter. This can occur when the host supplies a print command such as ESC 0x6d (n+m+2) d1 . . . dn DLE ENQ e1 . . . em.

In this case (d1 . . . dn DLE ENQ e1 . . . em) is an image data parameter of length (n+m+2) bytes. The problem presented by this type of image data parameter can be resolved by splitting the command in the middle of the real-time command byte sequence to generate two or more new print commands. For example, the abovenoted command can be split as follows:

ESC 0x6d (n+1) d1 . . . dn DLE

ESC 0x6d (m+1) ENQ e1. . . em.

In this case image (d1. . . dn DLE) is printed (n+1) dots wide, and then image (ENQ e1. . . em) is printed (m+1) dots wide.

This command division and conversion process is repeated until there are no real-time command data sequences present in the image print commands, thus converting the original image print command into a plurality of image print commands printing the same image as the original command.

Next, this command division and conversion process according to a second embodiment is described using, by way of example, another image print command. The image print command in this example is formatted as follows:

ESC*m n d1. . . dk (ESC 0x2a m n d1. . . dk)

where m is a parameter specifying, as shown in FIG. 9, the vertical (image height) dot count and the printed image density (in dots per inch, DPI) in both height (vertical) and width (horizontal) directions; n is a parameter specifying how many dots wide; and k indicates the total image data count sent by the image print command. For example, if m=0 or 1, the vertical dot count is 8 dots (equivalent to one byte) and k=n; if m=32 or 33, the vertical dot count is 24 dots (equivalent to 3 bytes) and k=3n; if m=80 or 81, the vertical dot count is 48 dots (equivalent to 6 bytes) and k=6n. It should be noted that image data parameters d1. . . dk are assumed to be arranged first along a column (in a vertical direction) and then along a row (in a width direction). See FIGS. 8A–8C. Typically, the vertical direction is the feeding direction of the recording medium in the printer, while the width direction is the direction of a printing line (or, in a serial printer, the direction in which the print head is reciprocated).

As noted above, there are two ways in which a data sequence identical to the data sequence of a real-time command can be included in an image print command in this example.

(1) A data sequence identical to the data sequence of a real-time command begins from the length parameter n.

This situation occurs when, as in the first embodiment described above, the length parameter n has a byte value DLE=0x10=16. In this case, the image print command may be divided into at least two parts in a similar manner as described in the first embodiment.

(2) A data sequence identical to the data sequence of a real-time command is contained in the image data parameter (d1. . . dk).

In this case, there is a possibility that a plurality of byte sequences, that is, 3-byte or 6-byte data sequences are arranged depending on the print dot density parameter m. It is, therefore, required to divide the image data in the middle of a column.

The command division and conversion process can be performed as described below with reference to FIGS. 7 and 8A–8C.

Figures 8A, 8B, 8C:
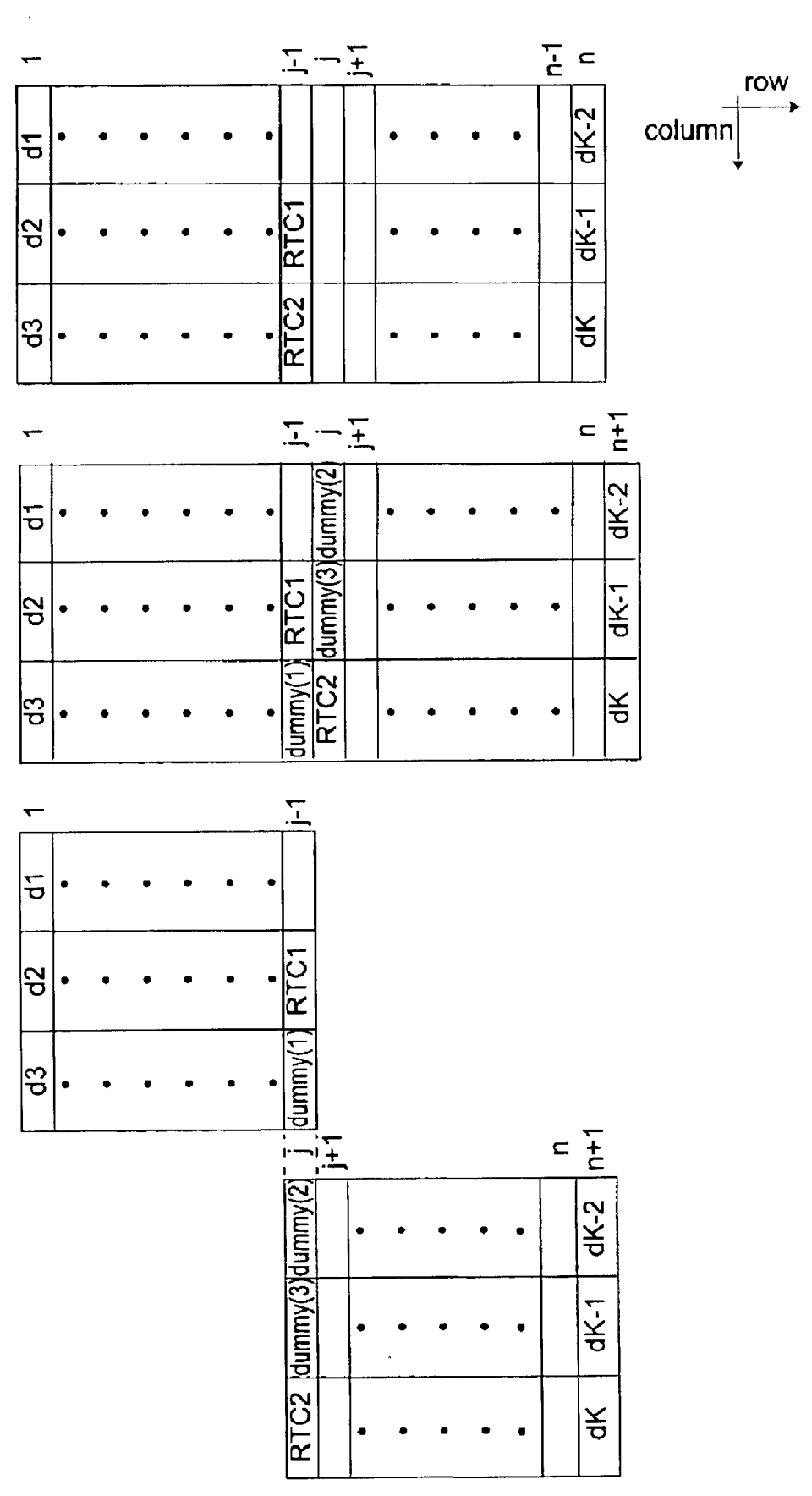

In the case where a data sequence identical to the data sequence of a real-time command is detected in step S604, dummy data (for example, null data) corresponding to the number of dots (the number of bytes) in the vertical direction indicated by the parameter m of the image print command is inserted between the first byte and the second byte of the data sequence identical to the real-time command. For example, when m=32 (3 bytes in the vertical direction), if a data sequence identical to a real-time command is located starting from the second row of a certain column ((j−1)th column), as shown in FIG. 8A, 3 bytes of dummy data are inserted between the first byte (RTC1) and the second byte (RTC2) as shown in FIG. 8B. As a result, the total number of image data increases by a value corresponding to the inserted dummy data, that is, a value corresponding to one column. Thus, if the number of dots in the horizontal direction is n, the number of dots in the horizontal direction becomes (n+1) dots, and the total number of data becomes 3(n+1) bytes.

Thereafter, the image data is divided into two parts such that the first divided data sequence includes in its last column the first byte RTC1 of the data sequence identical to the real time command, and the second divided data sequence includes in its first column either the data sequence including the second byte RTC2 of the data sequence identical to the real time command or all dummy data inserted (step S702), as shown in FIG. 8C.

In this step, the length parameter n associated with the image print command "ESC*32 n d(1). . . RTC1 RTC2. . . d(3n)" is converted depending on the position at which the division is performed in step S702, and the image print command is divided into the following two commands:

First part: ESC*32 (j−1) d1 . . . d(3j−5) RTC1 dummy1
Second part: ESC*32 (n−j+2) dummy2 dummy3 RTC2 d(3j+1). . . d(3(n+1))

where (j−1) is the length parameter of the first part of the image print command, and (n−j+2) is the length parameter of the second part of the image print command.

The print start position of the second part of the image print command, which has been moved in the direction along the row by an amount corresponding to one column (one dot) as a result of insertion of the dummy data, is corrected by, for example, a print position specifying command (step S703). After that, printing is performed such that the start position of the second part of data becomes coincident with the end position of the first part of data.

As described above, when image data includes a data sequence identical to the data sequence of a real-time command, the image data can be printed in a desired manner by inserting dummy data in the image data thereby dividing it and correcting the length parameters and the print start position.

In the case where a data sequence identical to the data sequence of a real-time command is located starting from the bottom row, that is if in the specific example shown in FIGS. 8A–C, RTC1, is located starting from the third row, all inserted dummy data is located in the first column of the second divided data sequence. Therefore, in this case, dummy data is not necessarily required, and the image data may be simply divided at a boundary between a column including RTC1 and a column including RTC2. In this case, the print start position does not require correction, and thus the control of the printing operation becomes easy and the throughput of the printer is increased.

In the case where, in the printing operation, the print start position can be specified by specifying a particular row number and column number, it is not required to use dummy data. In this case, the image data may be divided at a position specified by the row number and the column number where there is a data sequence identical to the data sequence of a real-time command, and the image data may be printed in a desired manner by specifying the print start position of the second part of data sequence by the row number and the column number.

It should be noted that while the present invention has been described above using a real-time command and image print command by way of example, the same method can be applied when other command systems are used, and such applications are also within the scope of the present invention.

Furthermore, a technique for converting normal commands for directly printing image data is described above, but the same technique can be applied to, for example, registering user-defined fonts. Such application to font registration is also within the scope of the present invention because font registration also involves converting image data (font shapes) to command data sequences for printing those shapes.

The present invention as described above provides the following benefits.

A printer controller and printer control method are provided for preventing a printer capable of handling real-time commands from operating erroneously due to image data containing data sequences identical to a real-time command data sequence.

More particularly, printer operating errors can be prevented using the present invention in a conventional printer without any modification to the printer by applying the present invention as a printer driver operating on a host computer for sending print commands to the printer. While the end user or application programmer must conventionally generate print commands so that they do not contain data sequences identical to a real-time command data sequence, application of the present invention in a printer driver eliminates this substantial burden on the end user or application programmer.

A data storage medium storing a program embodying the present invention can also be easily distributed or marketed independently of the general-purpose computer or printer hardware. By running the program stored on a data storage medium according to the present invention on a general purpose computer or other data processing device, the printer controller and printer control method of the present invention can be achieved by such computer or data processing device.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A printer controller comprising:
an evaluating unit that detects a specific data sequence in a send data stream to be sent to a printer;
a generating unit, responsive to the evaluating unit detecting the specific data sequence in the send data stream, that divides the send data stream into a plurality of data stream segments not containing the specific data sequence, the plurality of data stream segments functioning the same as the send data stream; and
a sending unit, responsive to the evaluating unit, that sends one of the send data stream and the plurality of data stream segments to the printer based on the detection result of the evaluating unit.

2. The printer controller as in claim 1, wherein:
the send data stream and each of the plurality of data stream segments have a header and a parameter block; and
the generating unit generates a header for each of the plurality of data stream segments that is the same as the header of the send data stream.

3. The printer controller as in claim 2, wherein:
the generating unit generates a parameter block for each data stream segment according to the number of segments generated from the send data stream.

4. The printer controller as in claim 1, wherein:
the specific data sequence is a data sequence of a real-time command of a printer.

5. A printer controller that transmits a send data stream to a printer, the send data stream including a print data sequence arranged in a matrix and having length parameters indicating the length in a row direction and the length in a column direction of the matrix, said printer controller comprising:
an evaluating unit that detects a specific data sequence in the print data sequence;
a determination unit, responsive to a detection result of the evaluating unit, that determines the position at which said specific data sequence is located if said specific data sequence is included in said print data sequence;
a division unit, responsive to a determination result of said determination unit, that inserts dummy data into the print data sequence and divides said print data sequence into a plurality of divided print data sequences;
a conversion unit, responsive to a determination result of said determination unit, that produces length parameters representing the lengths of respective divided print data sequences from the length parameters of the send data stream; and
a transmission unit, responsive to the evaluating unit, that transmits one of the send data stream and a plurality of data stream segments to the printer, the plurality of data stream segments including the divided print data sequences produced by said division unit and respective length parameters produced by said conversion unit.

6. The printer controller as in claim 5, wherein said division unit divides said print data sequence into a plurality of divided print data sequences without inserting dummy data into said print data sequence when said determination unit determines the specific data sequence is located starting from a position corresponding to the bottom row of the matrix.

7. The printer controller as in claim 5, wherein said division unit determines the length of dummy data to be inserted in accordance with the length parameters of said send data stream.

8. The printer controller as in claim 5, further comprising:
a print start position specifying unit that produces data specifying the print start positions of respective divided print data sequences produced by said division unit, and
wherein said transmission unit transmits to said printer said print start positions specifying data produced by said print start position specifying unit with the plurality of data stream segments.

9. The printer controller as in claim 5, wherein the column direction of said matrix is substantially the same as the printing medium feeding direction of said printer.

10. The printer controller as in claim 5, wherein:
the specific data sequence is a data sequence of a real-time command of a printer.

11. A printer control method comprising:
(a) detecting a specific data sequence in a send data stream to be sent to a printer;
(b) responsive to detection of the specific data sequence in the send data stream in step (a), dividing the send data stream into a plurality of data stream segments not containing the specific data sequence, the plurality of data stream segments functioning the same as the send data stream; and
(c) sending one of the send data stream and the plurality of data stream segments to the printer based on the detection result of step (a).

12. The printer control method as in claim 11, wherein:
the send data stream and each of the data stream segments have a header and a parameter block; and
step (b) comprises generating a header for each of the plurality of data stream segments that is the same as the header of the send data stream.

13. The printer control method as in claim 12, wherein:
step (b) generates a parameter block for each data stream segment according to the number of segments generated from the send data stream.

14. The control method as in claim 11, wherein:
the specific data sequence is a data sequence of a real-time command of a printer.

15. A control method for a printer controller that transmits a send data stream to a printer, the send data stream including a print data sequence arranged in a matrix and having length parameters indicating the length in a row direction and the length in a column direction of the matrix, said control method comprising:
(a) detecting a specific data sequence in said print data sequence;
(b) responsive to detection of the specific data sequence in the send data stream in step (a), determining the position at which said specific data sequence is located;
(c) inserting dummy data into the print data sequence in accordance with a determination result of step (b), and dividing the print data sequence into a plurality of divided print data sequences;
(d) producing length parameters representing the lengths of respective divided print data sequences from the length parameters of the send data stream in accordance with the determination result of step (b); and
(e) transmitting one of the send data stream and a plurality of data stream segments to the printer, the plurality of data stream segments including the divided print data sequences produced in step (c) and respective length parameters produced in step (d).

16. The control method as in claim 15, wherein the step (c) comprises dividing the print data sequence into a plurality of divided print data sequences without inserting dummy data into the print data sequence when the specific data sequence is located starting from a position corresponding to the bottom row of the matrix.

17. The control method as in claim 15, wherein step (c) comprises determining the length of dummy data to be inserted in accordance with the length parameters of the send data stream.

18. The control method as in claim 15, further comprising:
(f) producing data that specifies print start positions of the divided print data sequences produced by step (c), and
wherein step (e) transmits to a printer the print start position specifying data produced by step (f) with said plurality of data stream segments.

19. The control method as in claim 15, wherein a column direction of the matrix is substantially the same as a printing medium feeding direction of a printer.

20. The control method as in claims 15, wherein:
the specific data sequence is a data sequence of a real-time command of a printer.

21. A machine-readable data storage medium storing a program of instructions executable by said machine to perform a method of controlling a printer controller, said control method comprising:
(a) detecting a specific data sequence in a send data stream to be sent to a printer;
(b) responsive to detection of the specific data sequence in the send data stream in step (a), dividing the send data stream into a plurality of data stream segments not containing the specific data sequence, the plurality of data stream segments functioning the same as the send data stream; and
(c) sending one of the send data stream and the plurality of data stream segments to the printer based on the detection result of step (a).

22. The data storage medium as in claim 21, wherein:
the send data stream and each of the data stream segments have a header and a parameter block; and
step (b) comprises generating a header for each of the plurality of data stream segments that is the same as the header of the send data stream.

23. The data storage medium as in claim 22, in which:
step (b) generates a parameter block for each data stream segment according to the number of segments generated from the send data stream.

24. The data storage medium as in claim 21, wherein:
the specific data sequence is a data sequence of a real-time command of a printer.

25. The data storage medium as in claim 21, wherein:
the data storage medium comprises one of a compact disc, floppy disc, hard disk, magneto-optical disk, digital video disk, magnetic tape, and semiconductor memory.

26. A machine-readable data storage medium storing a program of instructions executable by the machine to perform a method of controlling a printer controller that transmits a send data stream to a printer, the send data stream including a print data sequence arranged in a matrix and having length parameters indicating the length in a row direction and the length in a column direction of the matrix, the control method comprising:
(a) detecting a specific data sequence in said print data sequence;
(b) responsive to detection of the specific data sequence in the send data stream in step (a), determining the position at which said specific data sequence is located;
(c) inserting dummy data into the print data sequence in accordance with a determination result of step (b), and dividing the print data sequence into a plurality of divided print data sequences;
(d) producing length parameters representing the lengths of respective divided print data sequences from the length parameters of the send data stream in accordance with the determination result of step (b); and
(e) transmitting one of the send data stream and a plurality of data stream segments to the printer, the plurality of data stream segments including the divided print data sequences produced in step (c) and respective length parameters produced in step (d).

27. The data storage medium as in claim 26, wherein the step (c) comprises dividing the print data sequence into a plurality of divided print data sequences without inserting dummy data into the print data sequence when the specific data sequence is located starting from a position corresponding to the bottom row of the matrix.

28. The data storage medium as in claim 26, wherein the step (c) determines the length of dummy data to be inserted in accordance with the length parameters of said send data stream.

29. The data storage medium as in claim 26, further comprising:
(f) producing data that specifies the print start positions of the divided print data sequences produced in step (c), and
wherein step (e) transmits to a printer the print start positions specifying data produced by step (of with said plurality of data stream segments.

30. The data storage medium as in claim 26, wherein a column direction of the matrix is substantially the same as a printing medium feeding direction of a printer.

31. The data storage medium as in claim 26, wherein:
the specific data sequence is a data sequence of a real-time command of a printer.

32. The data storage medium as in claims 26, wherein:
the data storage medium is one of a compact disc, floppy disc, hard disk, magneto-optical disk, digital video disk, magnetic tape, and semiconductor memory.

* * * * *

UNITED STATES PATENT AND TRADEMARK OFFICE
CERTIFICATE OF CORRECTION

PATENT NO. : 6,885,471 B1
DATED : April 26, 2005
INVENTOR(S) : Masahiro Minowa et al.

It is certified that error appears in the above-identified patent and that said Letters Patent is hereby corrected as shown below:

Column 16,
Line 45, please change "(of" to -- (f) --.

Signed and Sealed this

Sixteenth Day of August, 2005

JON W. DUDAS
*Director of the United States Patent and Trademark Office*